US010092135B2

(12) United States Patent
DeBruler

(10) Patent No.: US 10,092,135 B2
(45) Date of Patent: Oct. 9, 2018

(54) FIREBOX WITH FIRE/AIR CONTROL FOR KAMADO STYLE STOVE

(71) Applicant: Stephen Mark DeBruler, Zionsville, IN (US)

(72) Inventor: Stephen Mark DeBruler, Zionsville, IN (US)

( * ) Notice: Subject to any disclaimer, the term of this patent is extended or adjusted under 35 U.S.C. 154(b) by 283 days.

(21) Appl. No.: 15/014,437

(22) Filed: Feb. 3, 2016

(65) Prior Publication Data
US 2017/0215641 A1 Aug. 3, 2017

(51) Int. Cl.
*A47J 37/07* (2006.01)

(52) U.S. Cl.
CPC ....... *A47J 37/0763* (2013.01); *A47J 37/0704* (2013.01); *A47J 37/07* (2013.01)

(58) Field of Classification Search
CPC .... A47J 37/0704; A47J 37/0763; A47J 37/07; A47J 37/0731
See application file for complete search history.

(56) References Cited

U.S. PATENT DOCUMENTS

| 4,282,853 A * | 8/1981 | Reynolds | A47J 37/06 126/19 R |
| 4,741,321 A * | 5/1988 | Squires | A47J 37/0713 126/25 R |
| 7,159,509 B2 * | 1/2007 | Starkey | A47J 37/0704 126/25 R |
| 7,644,711 B2 * | 1/2010 | Creel | F24B 1/192 126/21 R |
| 8,746,643 B2 * | 6/2014 | Chance | A47J 37/0786 126/152 R |
| 9,074,775 B2 * | 7/2015 | McCary, Sr. | F24B 1/207 |
| 9,615,693 B1 * | 4/2017 | Merritt | A47J 37/0786 |
| 2007/0047166 A1 * | 3/2007 | Creel | F24B 1/192 361/118 |
| 2010/0258106 A1 * | 10/2010 | Simms, II | A47J 37/0704 126/25 R |
| 2013/0264445 A1 * | 10/2013 | Chance | A47J 37/0786 248/231.9 |
| 2013/0312732 A1 * | 11/2013 | Brennan | A47J 37/07 126/25 R |
| 2014/0130788 A1 * | 5/2014 | Contarino, Jr. | A47J 37/0786 126/25 R |
| 2016/0220066 A1 * | 8/2016 | Roberts | A47J 37/0786 |

FOREIGN PATENT DOCUMENTS

WO WO 2013116946 A1 * 8/2013 .......... A47J 37/0704

* cited by examiner

*Primary Examiner* — Avinash Savani
*Assistant Examiner* — Deepak Deean
(74) *Attorney, Agent, or Firm* — Woodard, Emhardt, Moriarty, McNett & Henry LLP

(57) ABSTRACT

A firebox assembly for generating smoke and conveying controlled amounts of smoke and air for a kamado oven. A firebox assembly has a door leading to a fire chamber, in turn, having an exit opening for smoke to flow into a smoke chamber. A chimney connected to the smoke chamber has slide gates to control the flow of smoke from the smoke chamber into the kamado oven. Further, the gates allow the smoke to be exhausted to the atmosphere and further allow atmospheric air to enter into the chimney eventually flowing to the kamado oven.

8 Claims, 17 Drawing Sheets

FIREBOX WITH FIRE/AIR CONTROL FOR KAMADO STYLE STOVE

BACKGROUND OF THE INVENTION

Field of the Invention

The present invention relates generally to the field of devices for controlling the flow of heated gases, smoke, and air to a cooker or oven.

Description of the Prior Art

Kamado style cookers are charcoal burning ceramic devices used for grilling, smoking, roasting, and baking. Kamado style cookers include an air inlet with an air flow control device in the base of the unit to supply air to the charcoal within the cooker and also include an air outlet with an air flow control device in the top of the kamado dome to regulate the rate of air exiting the cooker. The kamado dome is hinged from the kamado bottom, opening upwards to provide access to the interior of the kamado oven. The temperature in the kamado oven is monitored with an analog thermometer set in a hole in the kamado dome or with digital thermometer probes set in the kamado at any desired location. The temperature within the cooker can be controlled by adjusting either one or both vents to regulate the amount of oxygen to the charcoal through natural draft. In typical use, the air flow control device on the kamado's air inlet is open and the kamado's outlet air flow control, usually a daisy wheel, is used to control the temperature in the cooker. A grate is suspended over the charcoal fire within the kamado oven upon which to provide a cooking service for the food.

Kamado style cookers control their internal temperature by regulating the amount of oxygen available to the internal charcoal fire. A thermometer in the kamado provides feedback for temperature control of the cooker. Charcoal is typically used in a kamado instead of wood because of these oxygen-limited conditions. Charcoal is comprised of carbon with some quantities of ash derived from the combustion during charcoal production of other organic materials in the product used to create the charcoal. The type of charcoal used in kamados is typically a hardwood that has been burned at a high temperature (around 1,100 degrees F.) in an environment without oxygen.

A wood fire, combusted under conditions that do not limit the quantity of oxygen to the fire and at an appropriate combustion temperature, can create desirable flavoring gases that are difficult to create or sustain over time with charcoal or in a kamado. Most of the organic materials in the wood that create the desired flavoring gases have been destroyed in the production of the charcoal. However, the charcoal, lacking these organic materials, also does not create the undesirable flavorings that wood creates when combusted under the oxygen-limited conditions or at undesirable temperatures inside a kamado.

A wood fire not limited by oxygen goes through 4 distinct phases of burning indicated by the color of the smoke. The color of wood smoke indicates the sizes of the particles formed by the combustion, which are in turn determined by the temperature of the combustion. From coolest to hottest these are: black smoke (up to 300 degrees F.)-incomplete combustion of the wood resulting in acrid, bitter smoke and creosote; white smoke (300-570 degrees F.)-water evaporating from the wood; blue smoke (desirable) (570-750 degrees)-lightly tinted blue and otherwise clear, sweet smelling, containing desirable gases for flavoring; and no color (clear) (>750 degrees)-too hot to create desirable flavoring gases, though it can be used to cook but without significant smoke flavor.

In the present invention, the kamado is attached or associated with an external firebox assembly which provides heated gases and smoke created and drawn out of the fire chamber in the firebox into the kamado by natural draft or blown by forced draft from the fire chamber by a fan. The firebox assembly allows for the creation and sustaining of a fire that is not oxygen limited and is capable of creating the types of gases and smoke from wood or other combustible material desired for flavoring as well as heat. The amount of heated gases and smoke drawn or blown out of the firebox assembly into the kamado controls the temperature in the kamado, possibly in combination with heat created by a charcoal fire in the kamado and atmospheric air mixed with the heated gases and smoke.

The kamado's air inlet control device is replaced by the air controls in the chimney of the firebox assembly. The chimney's air control devices allow the user to control the rate and proportion of heated gases and smoke with the desired quantity of atmospheric air to be conveyed to the kamado air inlet. The thermometer in the kamado provides feedback to the user of the present invention for temperature control of the cooker.

When using a natural draft to transfer heated gases and smoke from the firebox assembly to the kamado, opening or closing the kamado outlet air flow control on the kamado air outlet controls the rate of heated gas and smoke drawn from the firebox assembly to the kamado and regulates the temperature in the kamado. Excess heated gases and smoke goes out the firebox assembly door. When using a forced draft to transfer the heated gases and smoke to the kamado, the temperature of the kamado is regulated by either air flow rate as controlled by a fan or the feed rate of combustion material, or both. In both cases, the combustion material is not limited in its combustion by the availability of oxygen.

In the above, it can be seen that it is advantageous to create a combustion source not limited by oxygen and capable of achieving a combustion temperature adequate to create desirable flavoring gases, and control the flow of this heated gas and smoke to the kamado. The firebox assembly disclosed herein includes valves or gates that allow control of each component, namely, heated gas, smoke, and outside air to the kamado thereby allowing the user to obtain optimum results by controlling the valves associated with the firebox assembly and the kamado's top outlet air flow control device.

SUMMARY OF THE PRESENT INVENTION

The present invention provides a firebox assembly to receive combustible material for generating smoke, and allowing controlled amounts of said smoke, possibly in combination with atmospheric air, to be conveyed to a kamado oven. The term "smoke" is used in a functional sense indicating the heated gaseous and aerosol liquid products of the combustion of wood or wood products along with entrained air.

In the present invention, a firebox assembly forms or contains a fire chamber in a surrounding insulating air space for combustible material with the firebox assembly having an opening into the fire chamber to allow combustible material to be manually or automatically inserted therein. Within the fire chamber, the combustible material is burned in the presence of adequate oxygen to prevent the combustion from being limited by oxygen supply. When the rate of combustion cannot be closely controlled, excess smoke is discharged from the fire chamber to the atmosphere. Control of the wood fire is improved where the fire chamber is insulated, though not sufficiently controlled to avoid excess smoke. Where the rate of combustion can be closely controlled, no excess smoke is created.

The smoke outlet of the fire chamber leads to a smoke chamber. The smoke chamber forms an enclosed conduit to transport the smoke from the fire chamber to the chimney.

A chimney leads from the smoke chamber to the kamado oven. The chimney includes flow control devices to control the amount of smoke and air flow to the oven. When in a first position the devices direct controlled amounts of smoke from the smoke chamber into a kamado oven and when in a second position the flow control devices direct controlled amounts of the smoke from the smoke chamber into the atmosphere. Further, the devices control the flow of atmospheric air into the kamado oven.

It is an object of the present invention to provide a firebox assembly having means for controlling the flow of smoke to a kamado style oven.

A further object of the present invention is to provide a firebox assembly with controls for regulating the flow of smoke and outside air to a kamado oven.

An additional object of the present invention is to provide a firebox assembly for controlling the proportions of smoke and outside air to a kamado oven.

Related objects and advantages of the present invention will be apparent from the following description.

BRIEF DESCRIPTION OF THE DRAWINGS

FIG. 1 is a fragmentary front view of the firebox assembly having removably mounted thereto a kamado style oven and depicting a wood fire in the fire chamber.

FIG. 2 is an orthogonal perspective view of the firebox assembly.

FIG. 3 is a right side view thereof.

FIG. 4 is a top view thereof.

FIG. 5 is a cross-sectional view of the firebox assembly taken along the line 5-5 of FIG. 1 and FIG. 4 and viewed in the direction of the arrows.

FIG. 6 is a bottom view of the firebox assembly.

FIG. 7 is a cross-sectional view taken along the line 7-7 of FIG. 3 and FIG. 4 and viewed in the direction of the arrows.

FIG. 8 is a left side view of the firebox assembly.

FIG. 9 is a fragmentary front view of the firebox assembly with a pellet smoker assembly having removably mounted thereto a kamado style oven.

FIG. 10 is an orthogonal perspective view of the firebox assembly without the pellet smoker assembly.

FIG. 11 is a top view of the firebox assembly of FIG. 10.

FIG. 12 is a cross-sectional view of the firebox assembly taken along the line 12-12 of FIG. 9 and FIG. 11 and viewed in the direction of the arrows.

FIG. 13 is a bottom view of the firebox assembly of FIG. 10.

FIG. 14 is a cross-sectional view taken along the line 14-14 of FIG. 11 and viewed in the direction of the arrows.

FIG. 15 is a left side view of the firebox assembly of FIG. 10.

FIG. 16 is a fragmentary front view of the firebox assembly having a circular pipe enclosure for a fire chamber, having the chimney attached on the left side of the firebox assembly, and removably mounted thereto a kamado style oven and depicting a wood fire in the fire chamber.

FIG. 17 is a fragmentary front view of the firebox assembly having the chimney mounted on the left side of the firebox assembly, a pellet smoker assembly mounted on the right side thereto, and with a kamado style oven removably mounted thereon.

DESCRIPTION OF THE EMBODIMENTS

Figure 1:
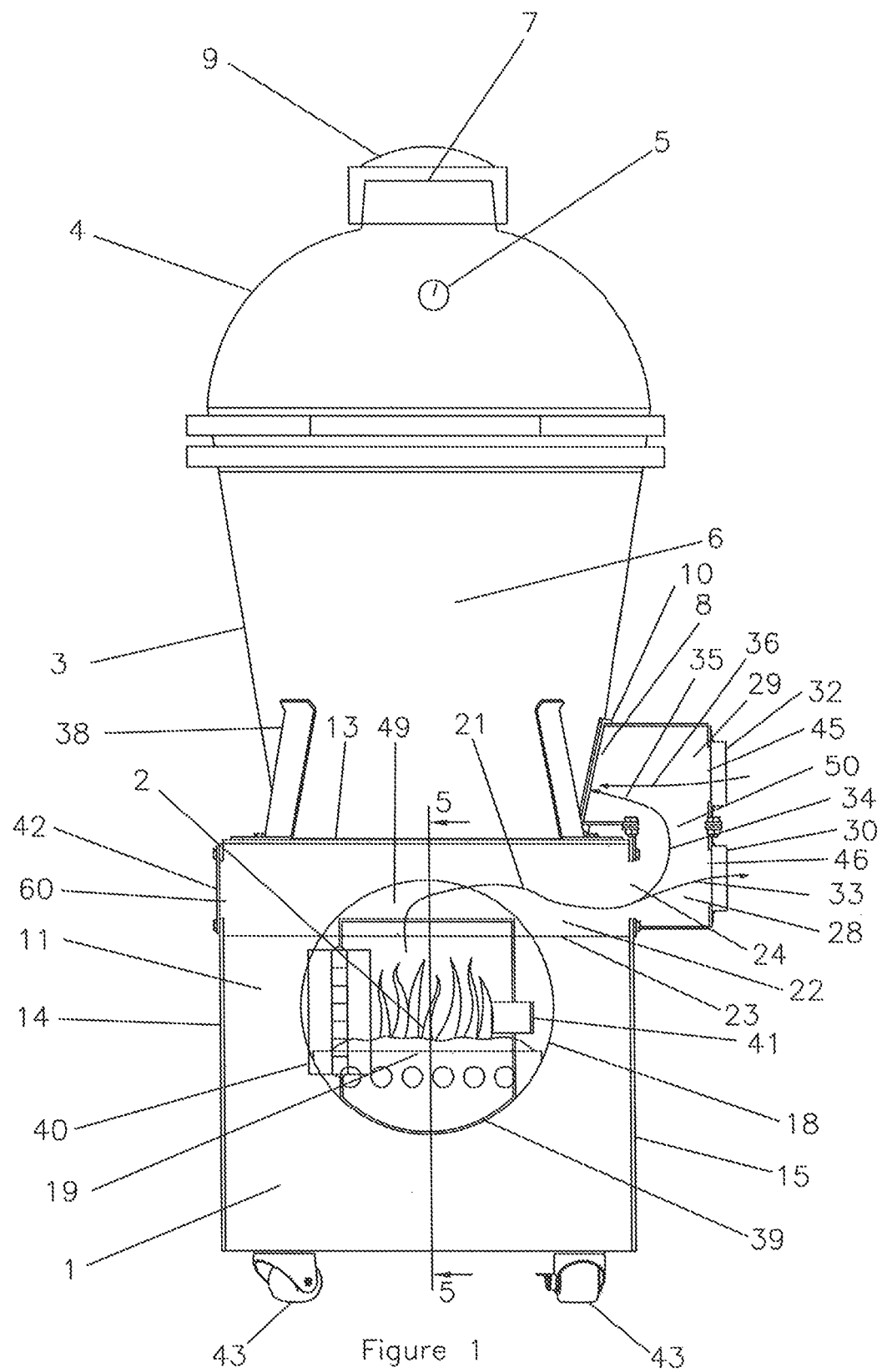
FIGS. 1 through 8 depict the invention with the preferred embodiment incorporating a wood-burning fire chamber as a combustion source.

For the purposes of promoting an understanding of the principles of the invention, reference will now be made to the embodiments illustrated in the drawings and specific language will be used to describe the same. It will nevertheless be understood that no limitation of the scope of the invention, such alterations and further modifications in the illustrated device, and such further applications of the principles of the invention as illustrated therein being contemplated as would normally occur to one skilled in the art to which the invention relates is thereby intended.

FIG. 1 through FIG. 8, inclusive, depict the preferred embodiment. FIGS. 9 through 17, inclusive, depict the firebox assembly with alternative embodiments. Wherever possible, the same reference numbers will be used throughout the drawings to refer to the same parts.

Referring now more particularly to the drawings, there is shown a firebox assembly 1 having a six sided box configuration with a front wall 11, right wall 15 with smoke chamber right port 24, left wall 14 with smoke chamber left port 60, and a rear wall 12 joined to a top wall 13. The six sided box configuration encloses a fire chamber 18 or 118 and a smoke chamber 22 or 122. A chimney 27 connects between the firebox assembly 1 and the kamado oven 3 by attachment to smoke chamber right port 24 or smoke chamber left port 60 and by locating the kamado air inlet 8 with the chimney discharge port 47. A bottom plate 16 on the firebox assembly 1 forms an air chamber 37 below the fire chamber 18 or 118 and the smoke chamber 22 or 122.

The preferred embodiment incorporates a fire chamber 18 (FIGS. 1, 5, and 7) in which wood or other combustible material can be burned to produce the desired fire 2 (FIG. 1) and smoke. The fire chamber 18 is formed by a cylindrical pipe enclosure. The front end of the cylindrical pipe enclosure is positioned adjacent to the front wall 11 (FIGS. 1-6, and 8) and is oriented with a door 39 (FIGS. 1, 2, and 5) in the front wall 11 opening into the fire chamber 18. Door 39 is mounted by hinge 40 (FIGS. 1-6, and 8) to the front wall 11. The door's closure position is limited by a door stop 41 (FIGS. 1-4, 6, and 8) mounted to the door 39 striking the front wall 11. The door positioning device also includes a latching mechanism (not shown) that in conjunction with a mating device (not shown) on the front wall 11 retains the door in the closed position.

Figure 5:
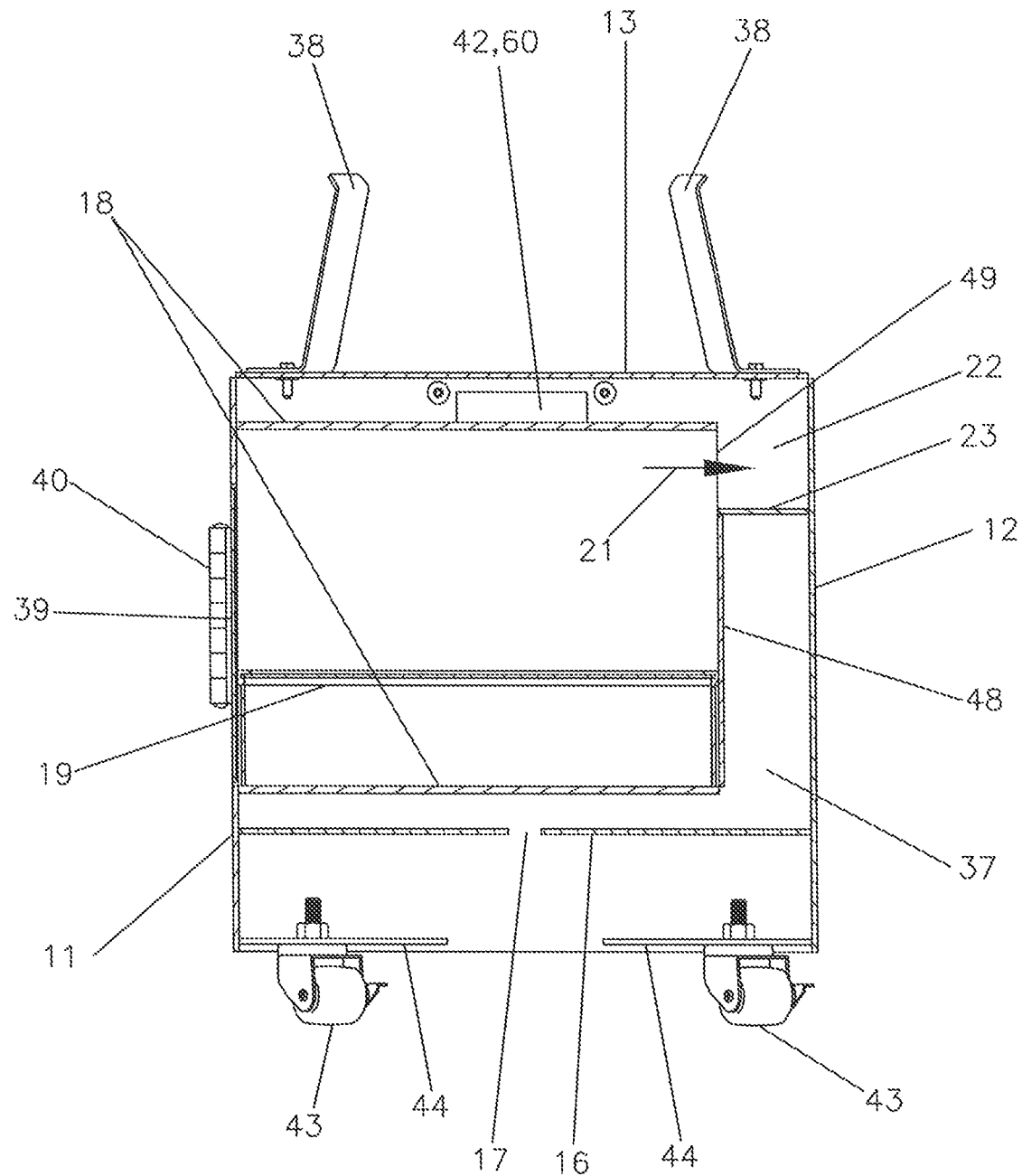
Figure 6:
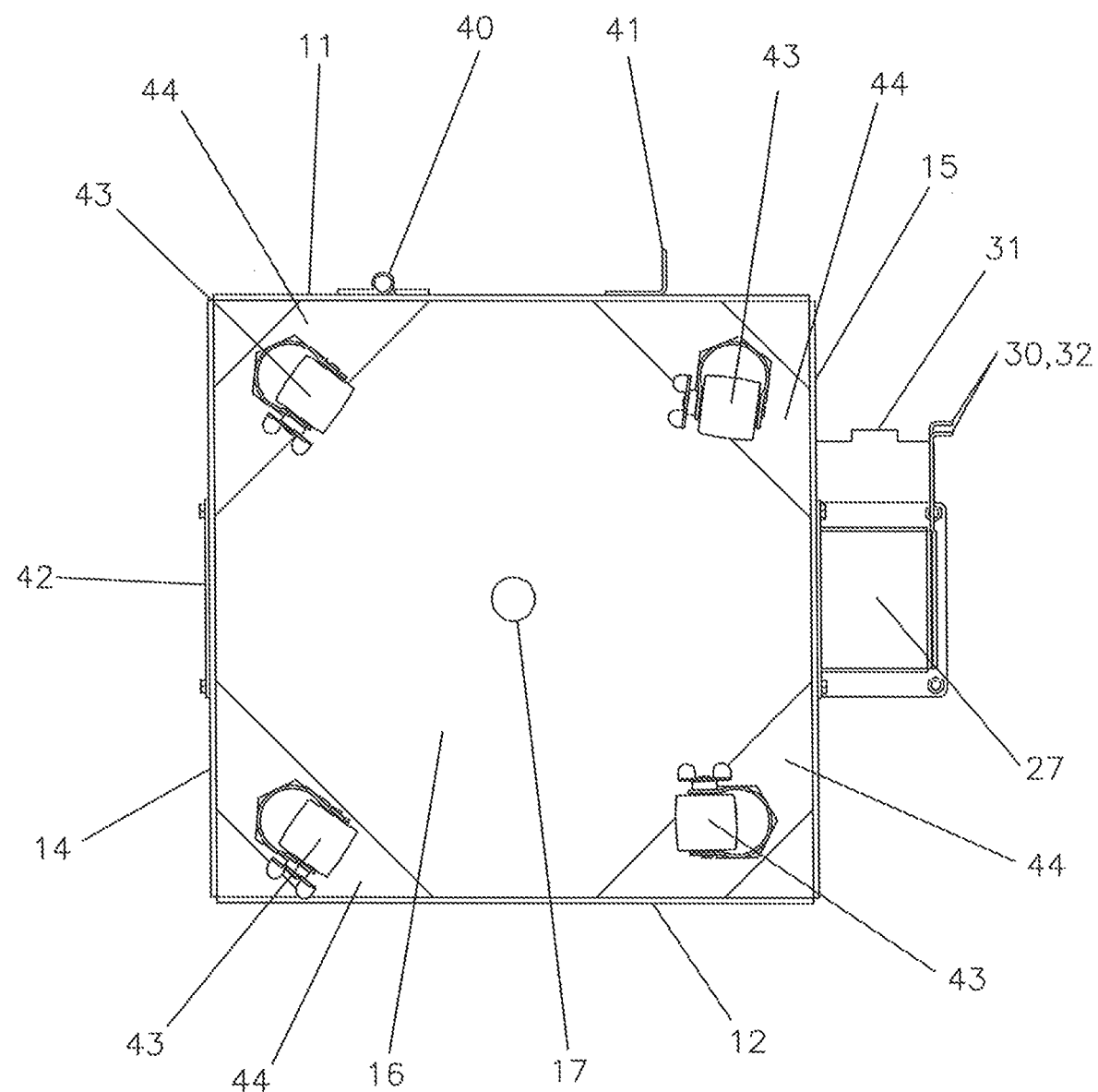
Figure 7:
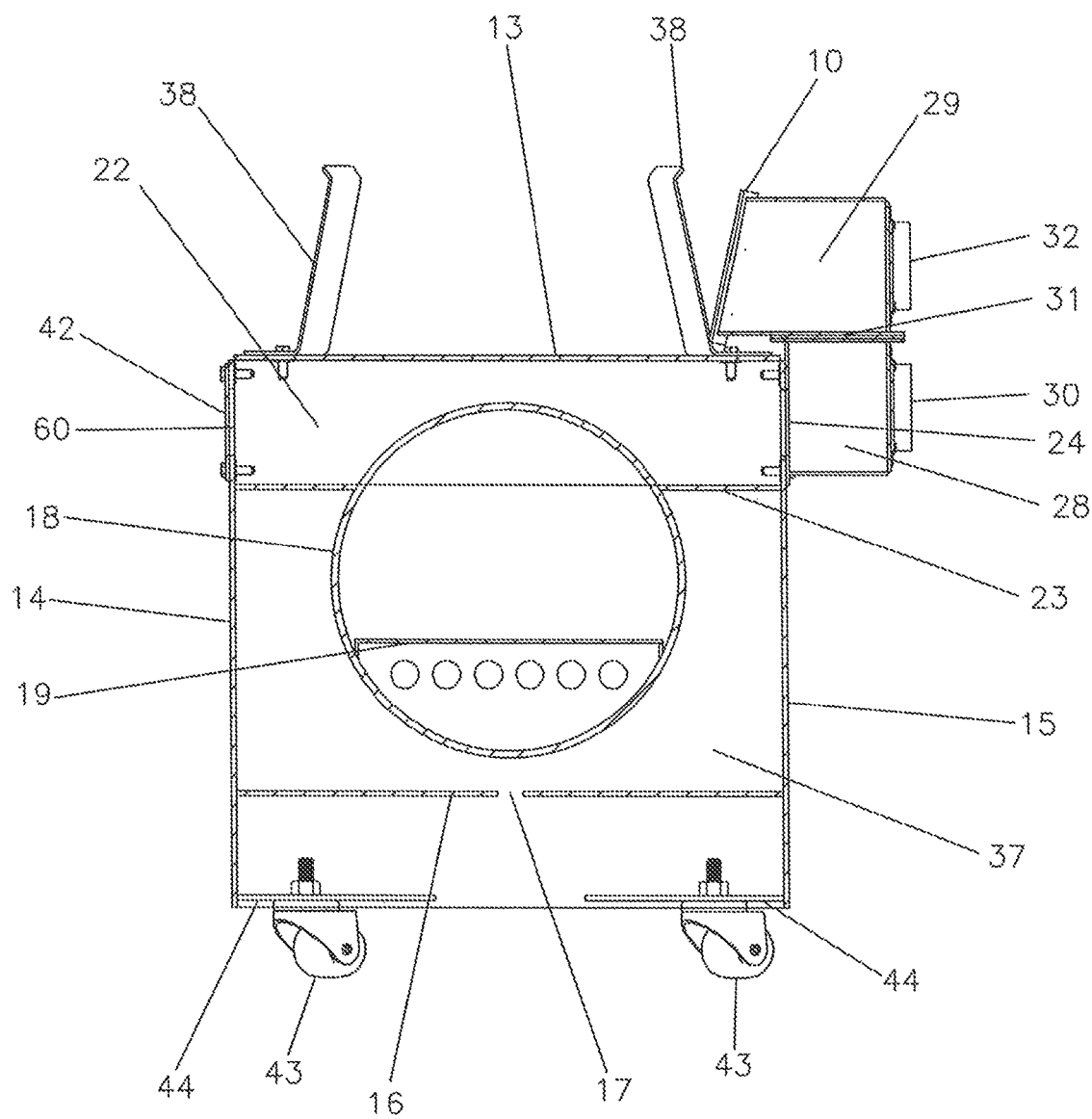
Figure 8:
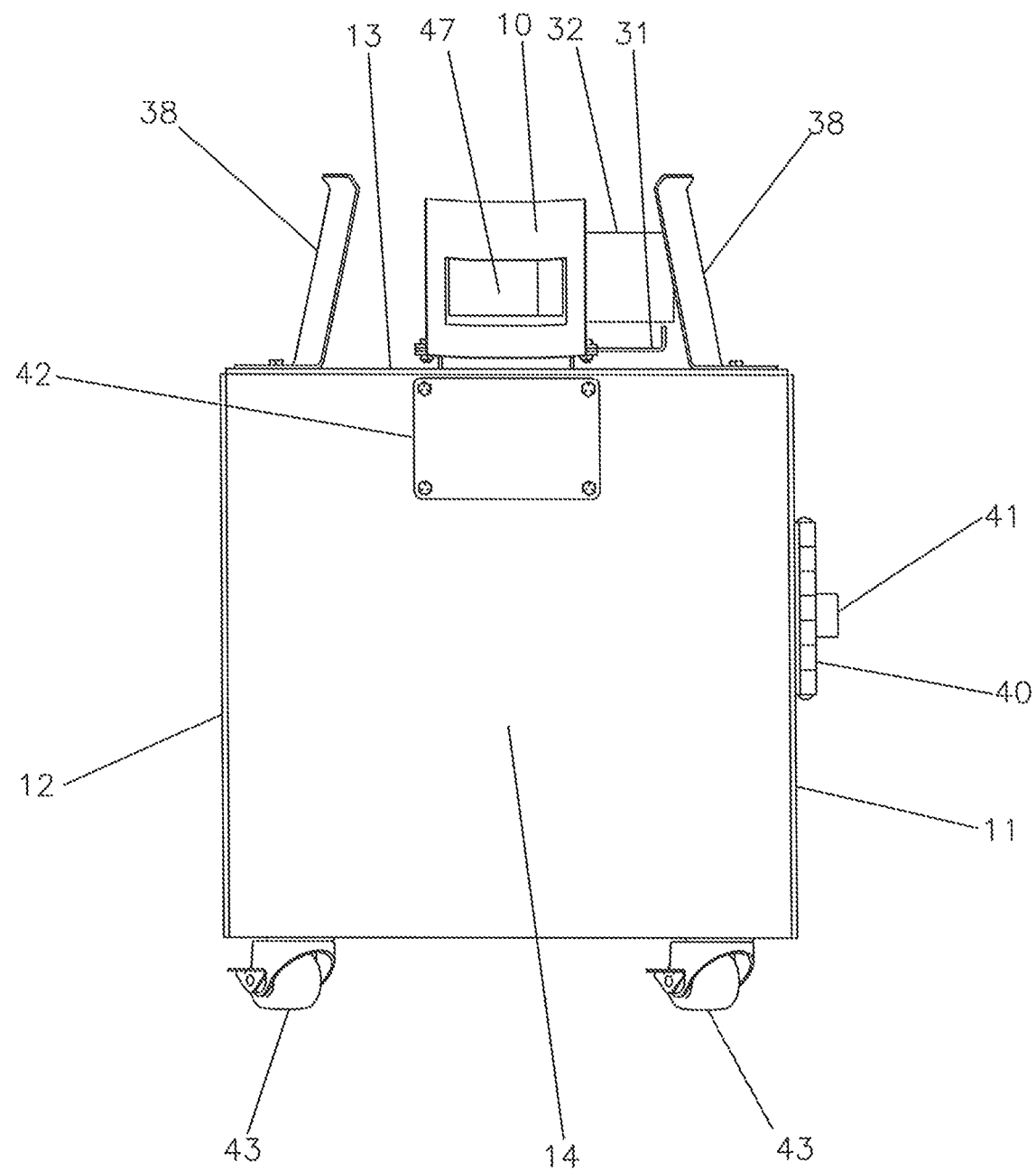

The opposite rear end of the cylindrical pipe enclosure is spaced apart from the rear wall 12 (FIGS. 3-6, and 8) and closed by a fire chamber back plate 48 (FIG. 5) attached to the back of the cylindrical pipe enclosure forming the lower back portion of the fire chamber 18 (FIGS. 1, 5, and 7). A fire chamber port 49 (FIG. 5) located at the top back of the fire chamber 18 above the fire chamber back plate 48 conveys smoke from the fire chamber 18 to the smoke chamber 22 (FIGS. 1, 5, and 7). An elevated fire grate 19

(FIGS. 1, 5, and 7) is positioned within the fire chamber 18 formed by the cylindrical pipe enclosure upon which combustible material can be placed.

Figure 9:
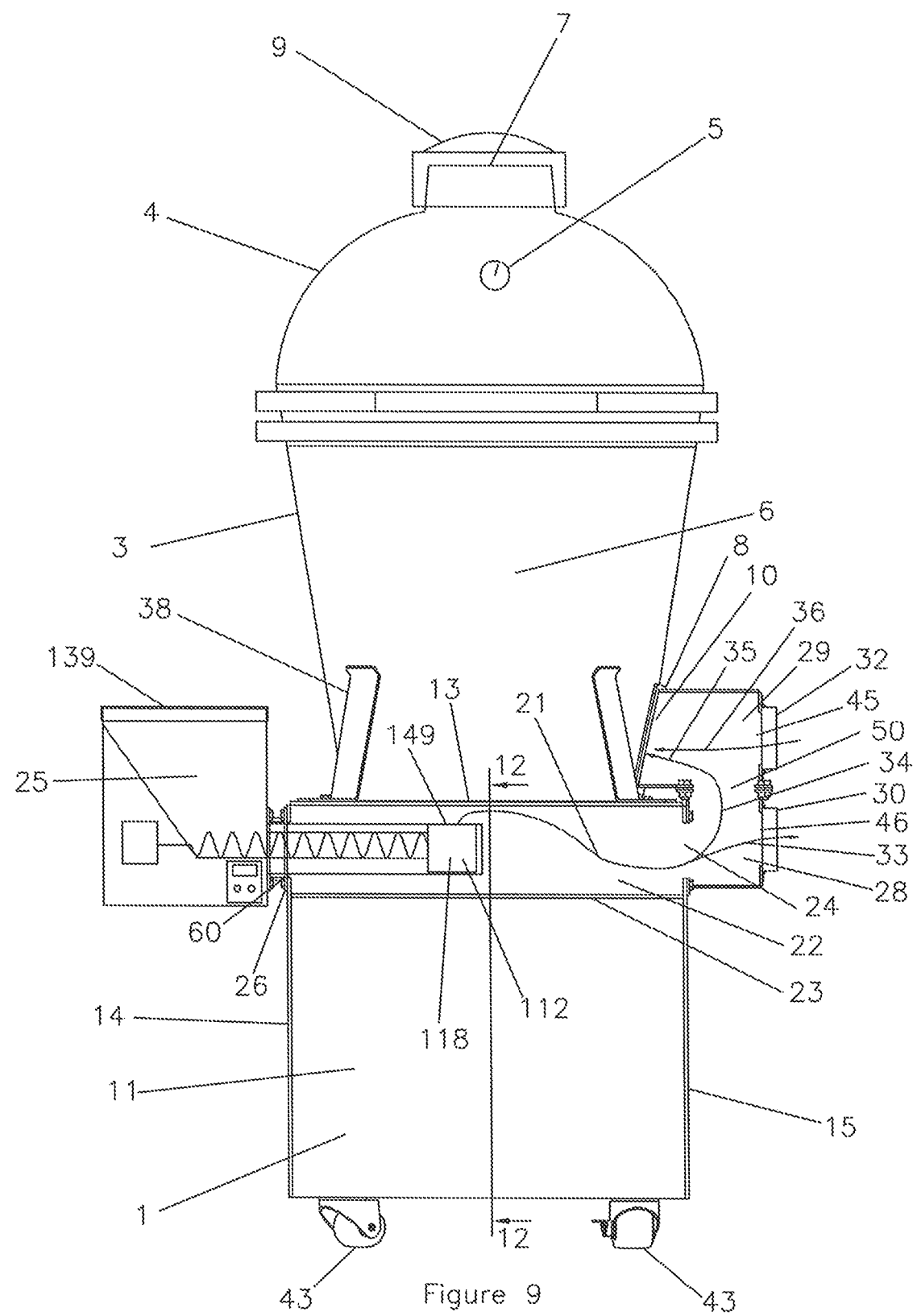
FIGS. 9 through 17 depict the invention with alternative embodiments, including a pellet smoker assembly as a combustion source, an alternative smoke chamber, an alternative bottom plate, an alternative arrangement of the chimney and cover plate, and an alternative arrangement of the chimney and pellet smoker assembly adapter.
Figure 11:
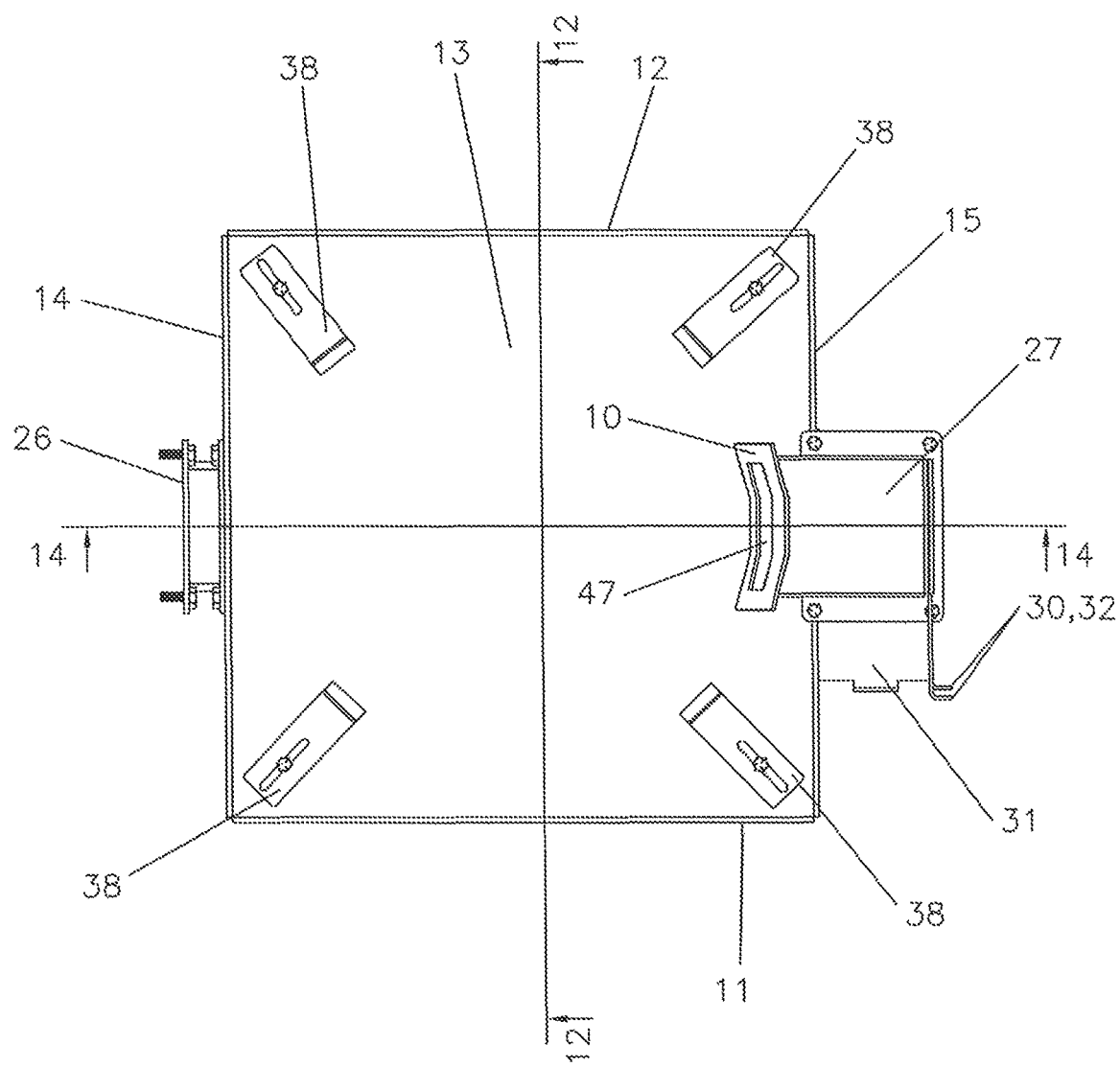
Figure 12:
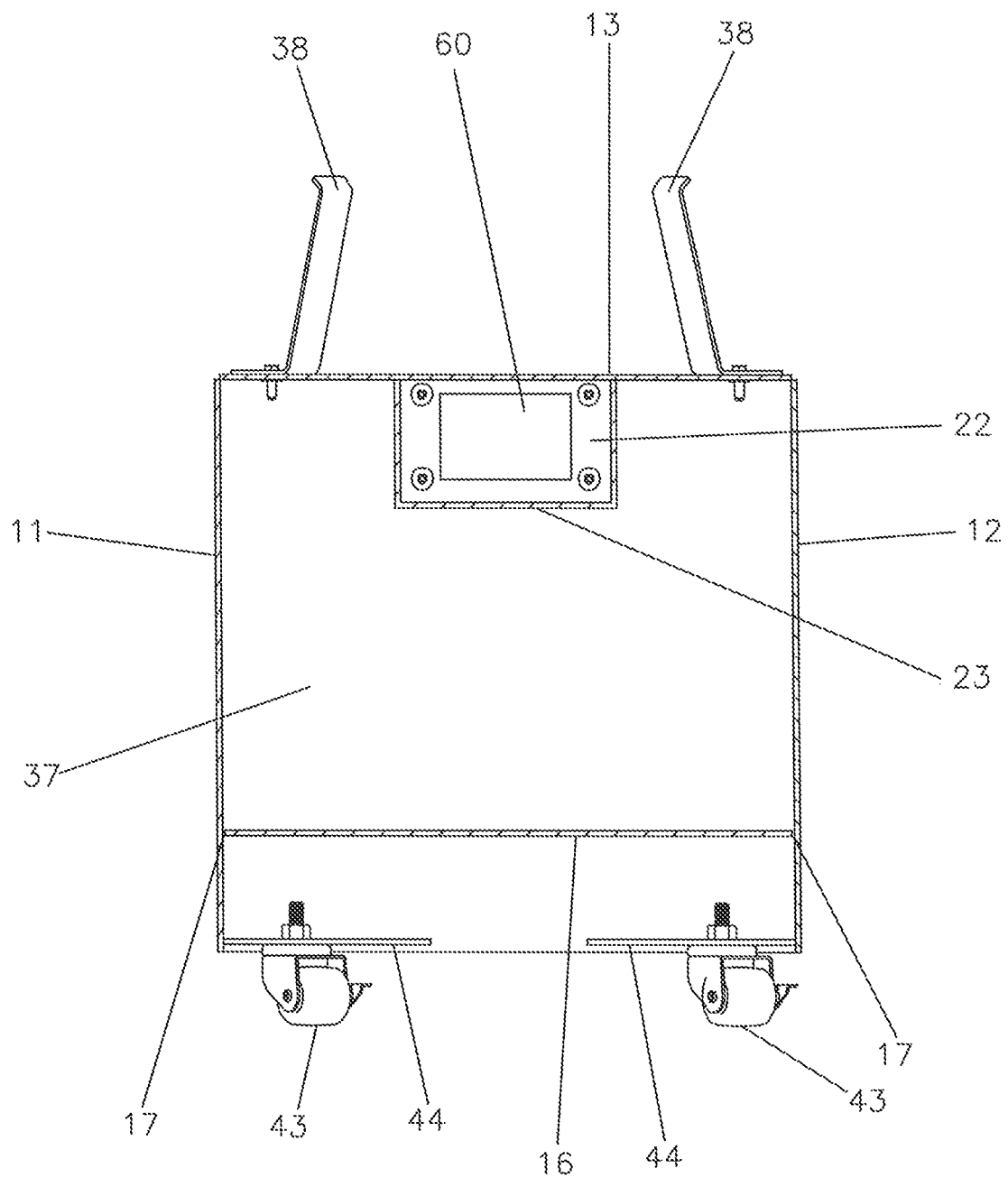
Figure 13:
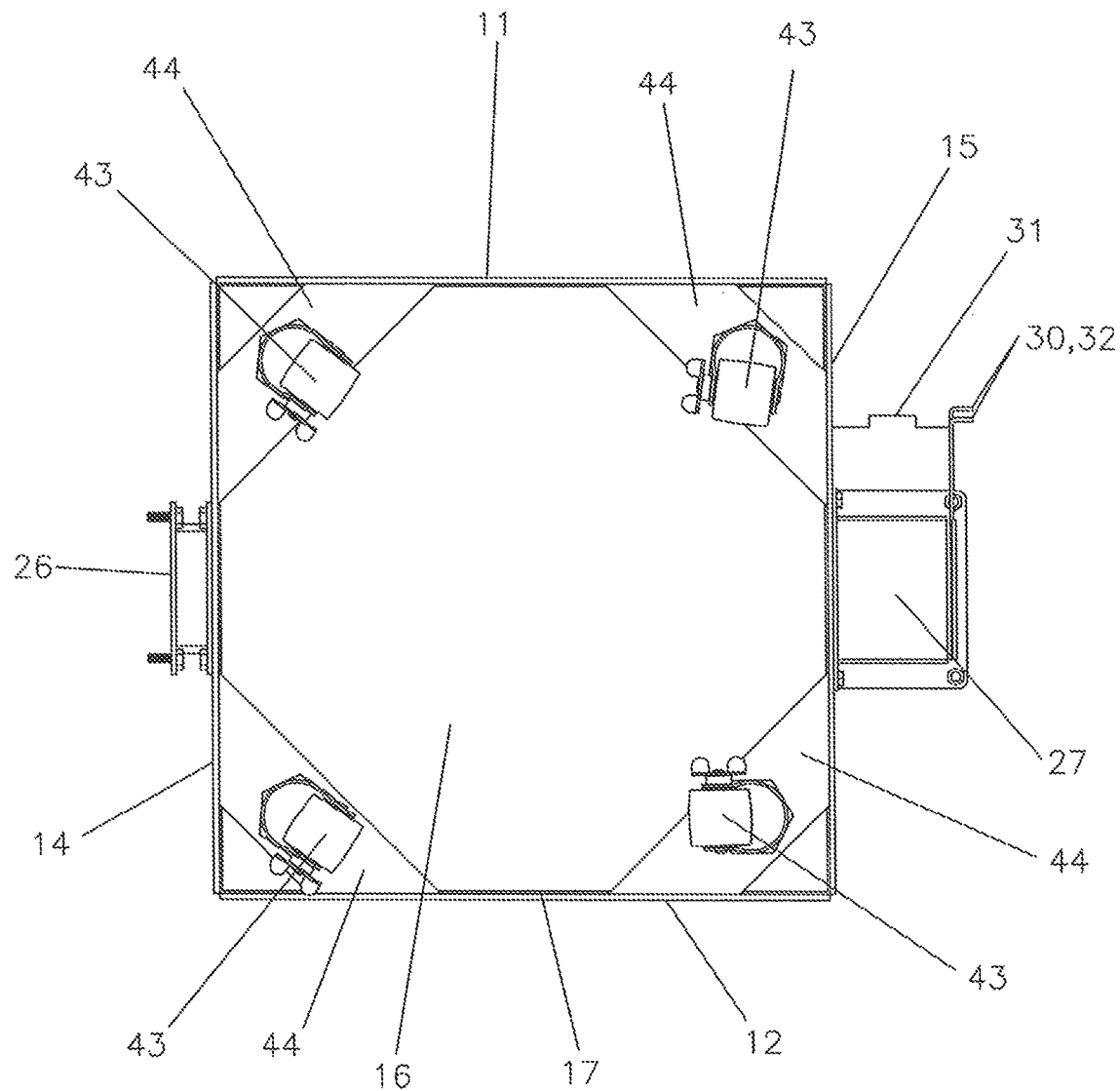
Figure 14:
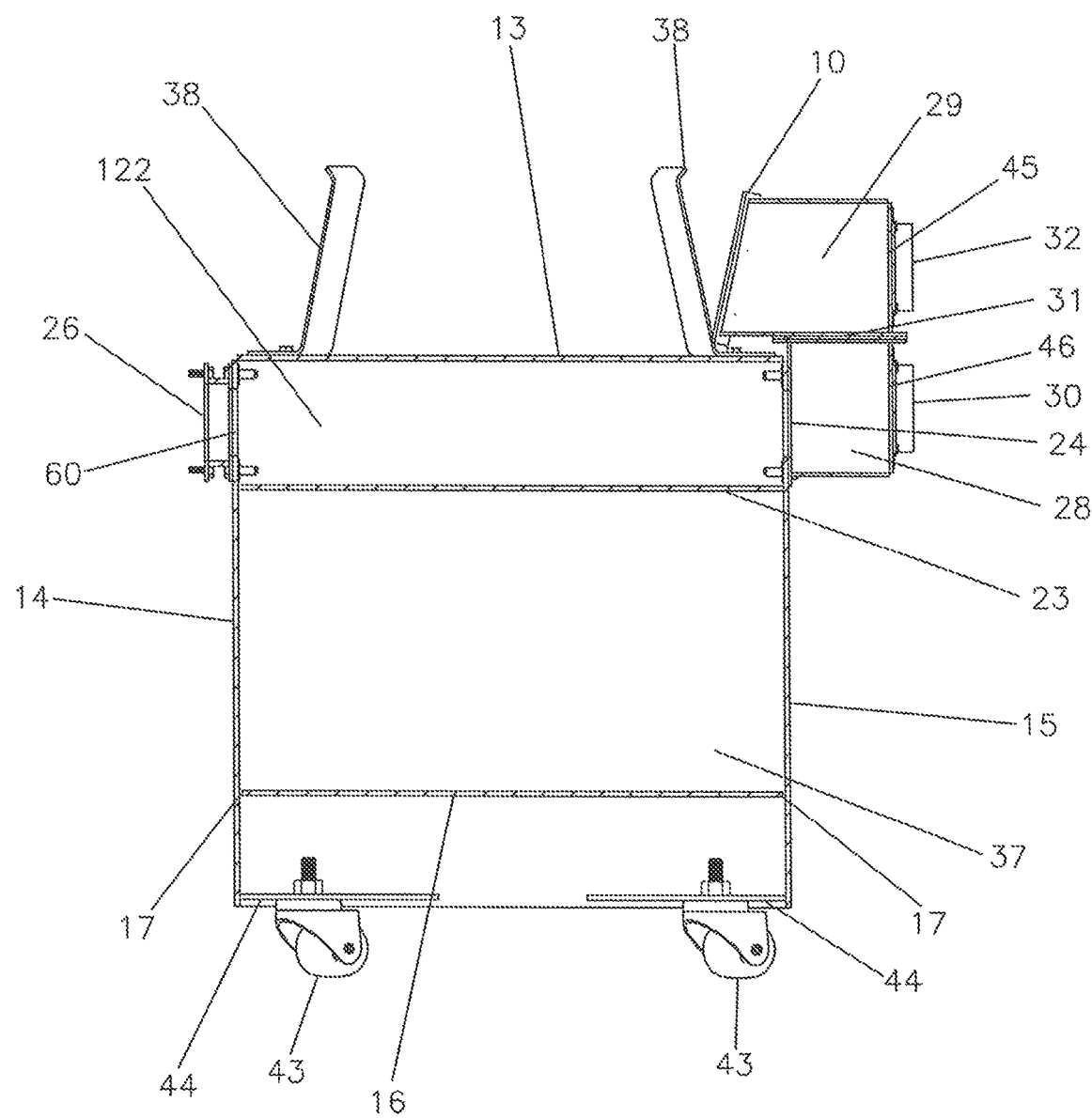
Figure 15:
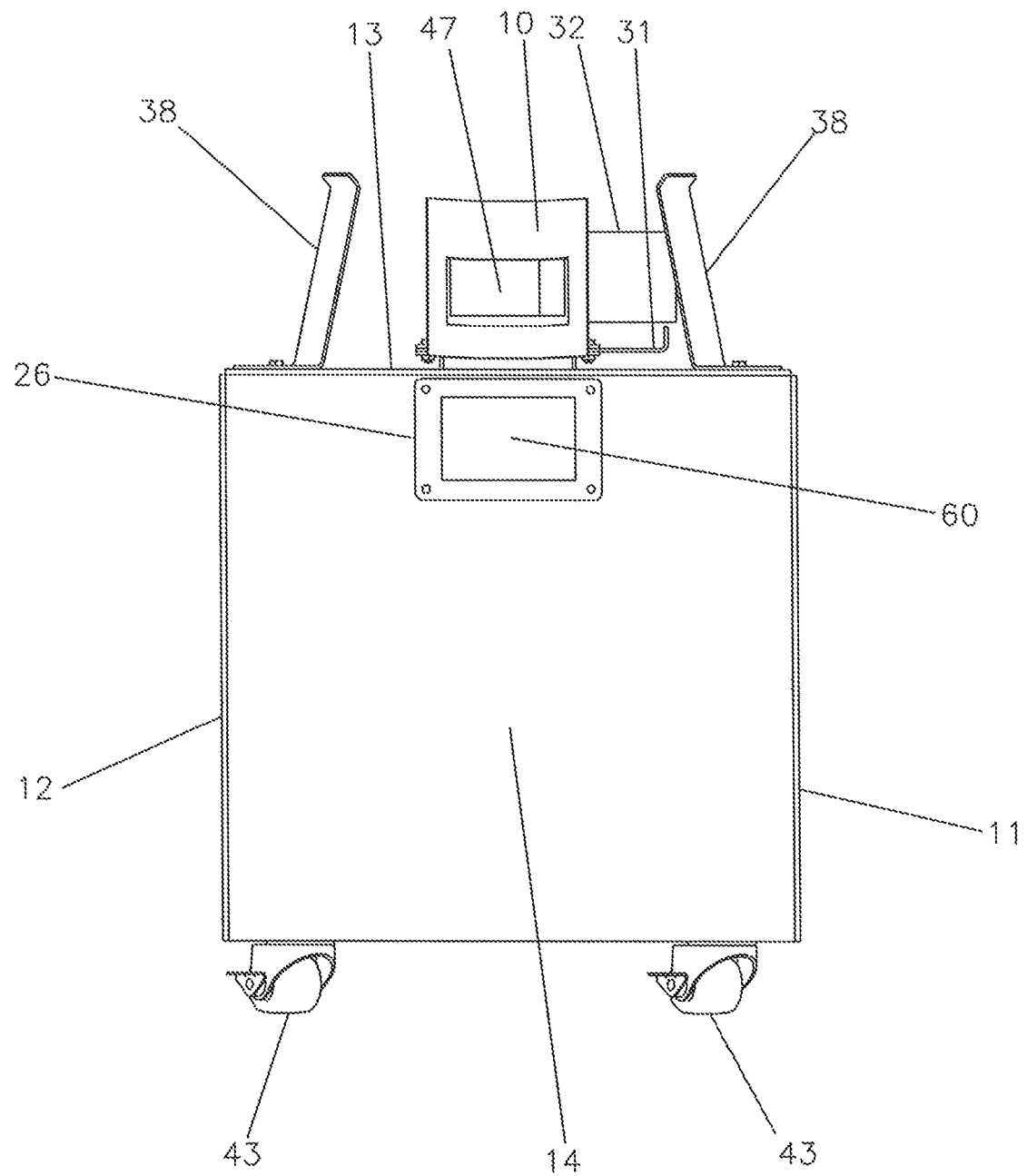
Figure 16:
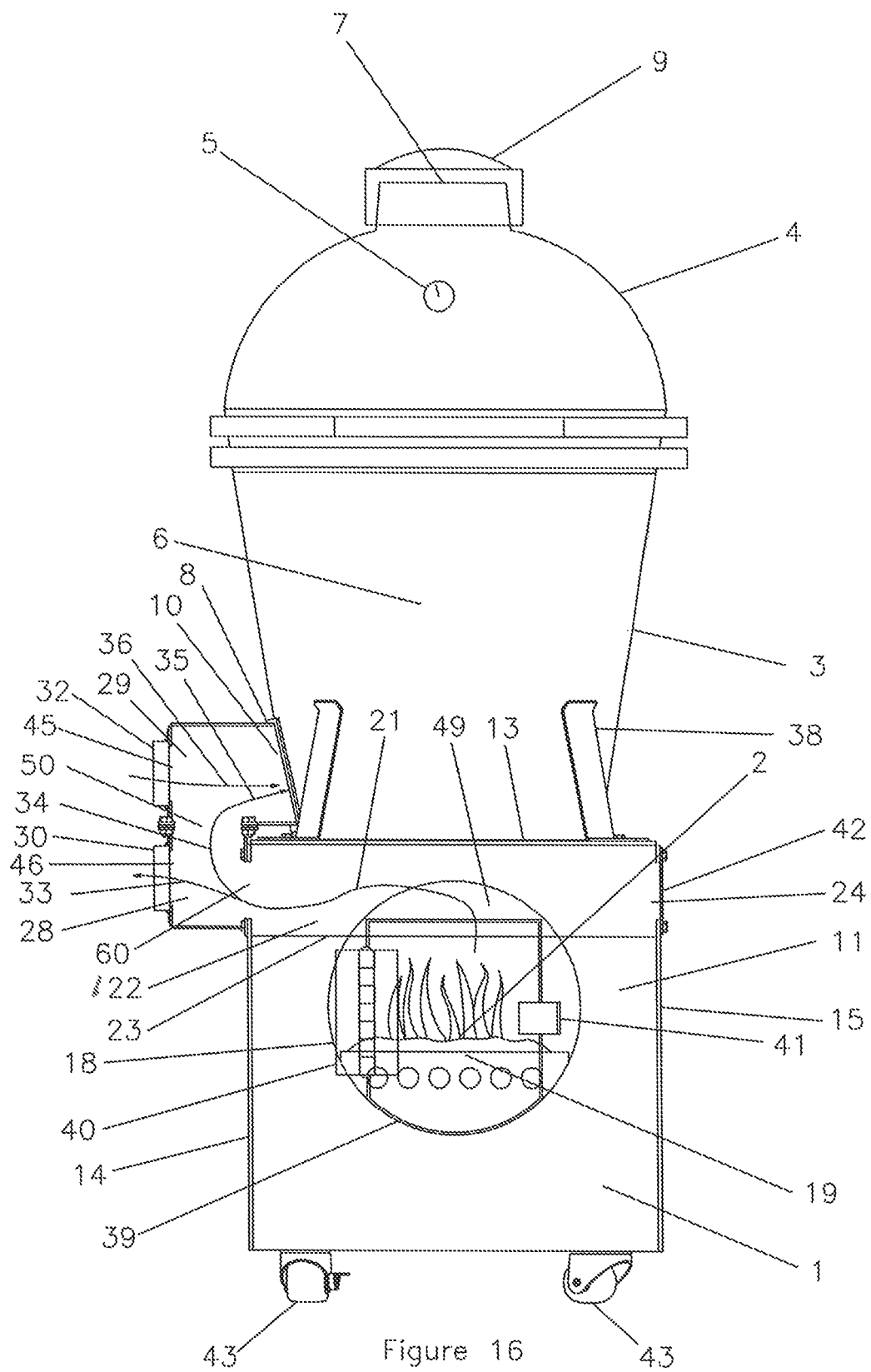
Figure 17:
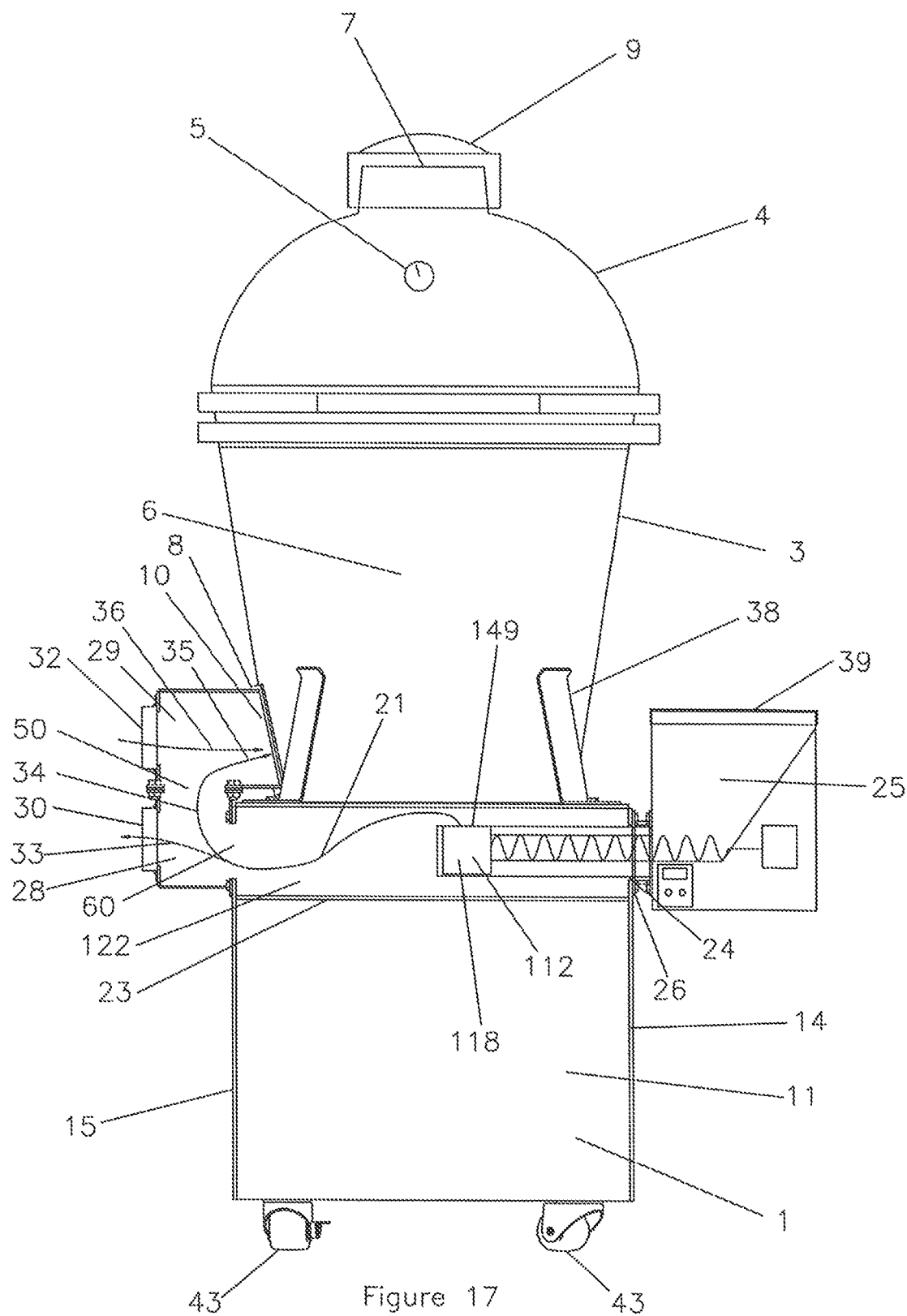

An alternative embodiment incorporates a pellet smoker assembly 25 (FIG. 9) with a fire chamber to produce the desired smoke. A pellet smoker assembly 25 includes a pellet hopper, feed system (typically an auger), control system, fan, and a fire pot with igniter to burn wood pellets or similar combustible material. An example pellet smoker assembly is provided by Pellet Pro® Hopper Assemblies available from Smoke Daddy Inc., 49 Le Baron Street, Suite A, Waukegan, Ill. 60085. The fire pot in the pellet smoker assembly 25 functions as a fire chamber 118 (FIG. 9), combusting the wood pellets and releasing the resulting smoke into the smoke chamber 122 through a hole in the top of the fire pot that represents the fire chamber port 149 (FIG. 9). The pellet smoker assembly 25 is placed through the smoke chamber left port 60 (FIG. 12) and within the smoke chamber 122 (FIGS. 9, 12, and 14). A pellet smoker assembly adapter 26 (FIGS. 9-11 and 13-15) is used to attach and support the pellet smoker assembly 25 on the firebox assembly 1 (FIG. 9).

To add combustible material to the fire chamber 18 (FIGS. 1, 5, and 7) in the preferred embodiment, a door 39 (FIGS. 1, 2, and 5) is formed in the front wall 11 (FIGS. 1-6, and 8) of the firebox assembly 1 (FIG. 1) opening into the fire chamber 18. This door allows the combustible material to be placed and adjusted in the fire chamber 18 for management of the fire 2 (FIG. 1). A door stop 41 (FIGS. 1-4, 6, and 8) is attached to the door 39 opposite the hinge 40. This door stop strikes the front wall 11 when the door is in the closed position and is retained in the closed position until release by a latching mechanism (not shown).

The door 139 (FIG. 9) of the pellet smoker assembly 25 (FIG. 9) in the alternative embodiment, located on the top of the pellet smoker assembly 25 above the pellet hopper, allows combustible material to be placed in the hopper to be fed to the fire chamber 118 (FIG. 9) for management of the fire 112 (FIG. 9).

A smoke chamber 22 or 122 is formed in the top of the firebox assembly 1. The purpose of the smoke chamber 22 or 122 is to transport smoke from the fire chamber 18 or 118 to the chimney 27. Smoke flows from the fire chamber 18 or 118 to the smoke chamber 22 or 122 through a fire chamber port 49 or 149 between the fire chamber 18 or 118 and the smoke chamber 22 or 122. Connection from the smoke chamber 22 or 122 to the chimney 27 is through smoke chamber right port 24 or smoke chamber left port 60. Smoke chamber right port 24 or smoke chamber left port 60, if not used for connection of the chimney 27 or insertion of the pellet smoker assembly 25, is closed with a cover plate 42.

In the preferred embodiment, the smoke chamber 22 (FIGS. 1, 5, and 7) is formed by a smoke chamber plate 23 (FIGS. 5 and 7) placed below smoke chamber right port 24 and smoke chamber left port 60 (FIGS. 1 and 7), extending from the left wall 14 (FIGS. 1, 4, and 6-8) to the right wall 15 (FIGS. 1-4, 6, and 7) and from the front wall 11 (FIGS. 1-6, and 8) to the rear wall 12 (FIGS. 3-6, and 8). Portions of the right wall 15, the left wall 14, the front wall 11, and the rear wall 12 above the smoke chamber plate 23, in combination with the entirety of the top wall 13 (FIGS. 2-5, 7, and 8) form the remaining walls of the smoke chamber 22. The fire chamber 18 (FIGS. 1, 5, and 7) protrudes through a portion of the smoke chamber plate 23, forming a portion of this smoke chamber plate where protruding therethrough.

A cover plate 42 (FIGS. 1, and 4-8) is placed over the unused smoke chamber left port 60 (FIGS. 1 and 5) in the left wall 14.

Figure 10:
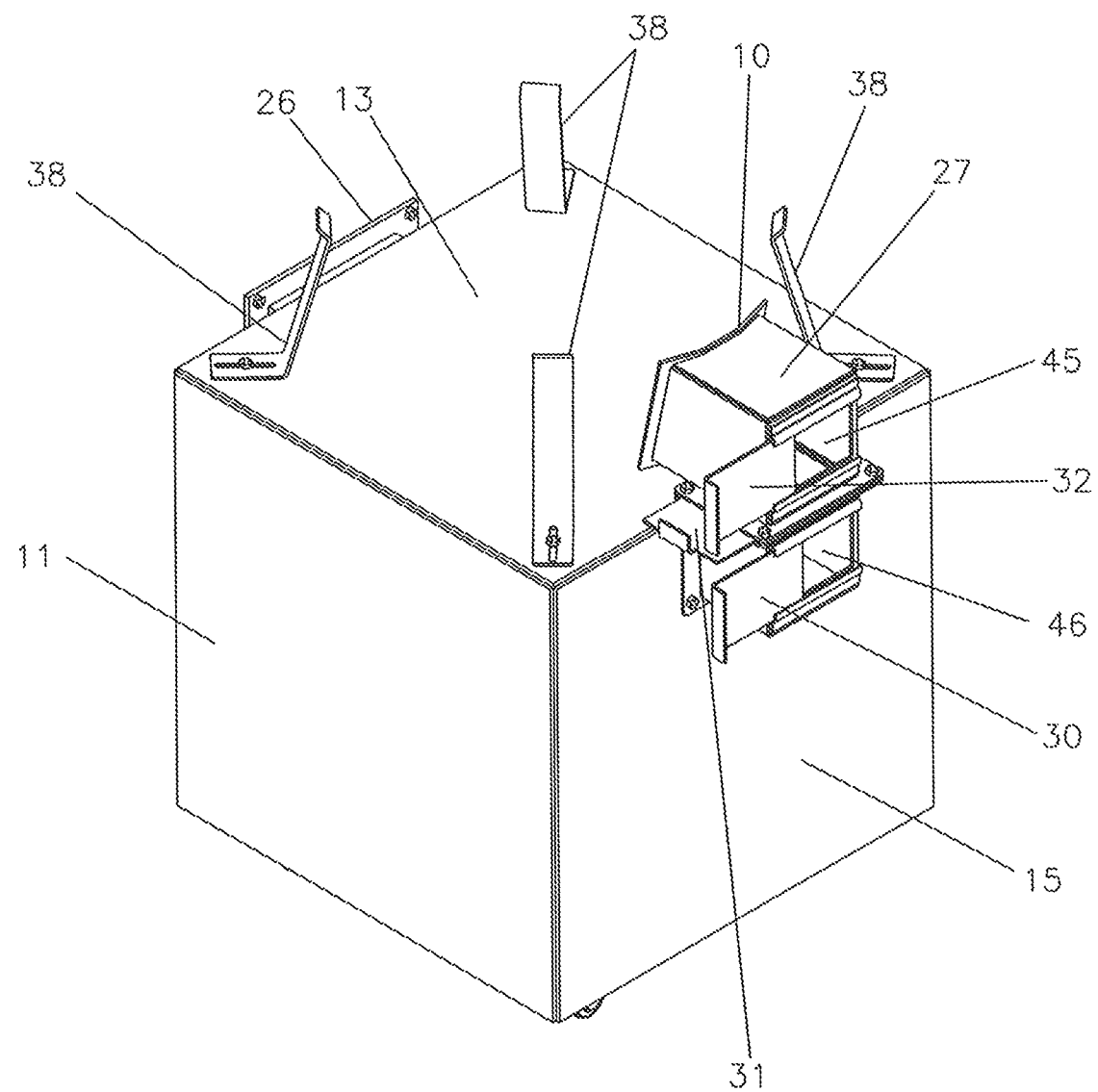

In an alternative embodiment of the smoke chamber 122 (FIGS. 9, 12, and 14), a conduit is formed from right wall 15 (FIGS. 9-11, 13 and 14) to left wall 14 (FIGS. 9, 11, and 13-15), connecting to these side walls around smoke chamber right port 24 (FIGS. 9 and 14) and smoke chamber left port 60 (FIGS. 9 and 14) and extending to the top wall 13 (FIGS. 10-12, 14, and 15) a portion of which comprises the top of the conduit, such that the conduit extends continuously between the smoke chamber right port 24 and smoke chamber left port 60 and is closed except at such forementioned ports. The fire chamber 118 (FIG. 9) of the pellet smoker assembly 25 (FIG. 9) is inserted through smoke chamber left port 60 in the left wall 14 so that it is located within the smoke chamber 122. Smoke is discharged from the fire chamber port 149 (FIG. 9) of the pellet smoker assembly 25 and conveyed by the smoke chamber 122 through smoke chamber right port 24 to the chimney 27 (FIGS. 10, 11, and 13).

A bottom plate 16 (FIGS. 5-7) in the preferred embodiment is located beneath the fire chamber 18 (FIGS. 1, 5, and 7) and the smoke chamber 22 (FIGS. 1, 5, and 7). The purpose of the bottom plate 16 is to create an insulating air chamber 37 (FIGS. 5 and 7) below the fire chamber 18 and the smoke chamber 22 to improve control of the fire 2 (FIG. 1). The bottom plate 16 extends from the left wall 14 (FIGS. 1, 4, and 6-8) to the right wall 15 (FIGS. 1-4, 6, and 7) and from the front wall 11 (FIGS. 1-6, and 8) to the rear wall 12 (FIGS. 3-6, and 8). The bottom plate 16 includes an air hole 17 (FIGS. 5-7) to allow expansive heated air within the air chamber to escape as a result of the temperature within the chamber increasing as the fire chamber 18 and smoke chamber 22 give off heat.

An alternative embodiment of the bottom plate 16 (FIGS. 12-14) spaces apart the side edges of the bottom plate 16 from the right wall 15 (FIGS. 9-11, 13 and 14), left wall 14 (FIGS. 9, 11, and 13-15), front wall 11 (FIGS. 9-13 and 15), and rear wall 12 (FIGS. 11-13 and 15) of the firebox assembly 1 (FIG. 9) to provide an air hole 17 (FIGS. 12-14) in the bottom plate 16 to allow air to escape the air chamber 37 (FIGS. 12 and 14) located beneath the smoke chamber 122 (FIGS. 9, 12, and 14) and the fire chamber 118 (FIG. 9) providing an insulating air space to improve control of the fire 112 (FIG. 9).

In both embodiments, conventional wheel brackets 44 (FIGS. 5-7, and 12-14) and wheels 43 (FIGS. 1, 3, 5-9, and 12-15) are mounted to the bottom of the firebox assembly 1 (FIGS. 1.9, 16, and 17).

A chimney 27 is attached to firebox assembly 1 to receive smoke from the smoke chamber 22 or 122 and to transport controlled volumes of said smoke, possibly in combination with atmospheric air, to the kamado air inlet 8. The chimney 27 attaches to the firebox assembly 1 at the smoke chamber right port 24 (in the preferred embodiment) or the smoke chamber left port 60 (in the alternative embodiment) to receive smoke from the smoke chamber 22 or 122.

The chimney 27 contains two chambers, a lower chimney chamber 28 and an upper chimney chamber 29. The lower chimney chamber 28 communicates with the smoke chamber 22 or 122 through smoke chamber right port 24 or smoke chamber left port 60 to receive smoke and transports such smoke to the atmosphere through lower chimney port 46 controlled by lower chimney air valve 30 or to the upper chimney chamber 29 through chimney interchamber port 50 controlled by the middle chimney air valve 31. The upper chimney chamber 29 receives smoke from the lower chimney chamber 28 via chimney interchamber port 50 controlled by middle chimney air valve 31 or receives atmospheric air through upper chimney port 45 controlled by upper chimney air valve 32. The smoke, atmospheric air, or combination thereof is transported from the upper chimney chamber 29 to the kamado air inlet 8 via the chimney discharge port 47.

The chimney has a concave kamado adapter plate 10 complementary in shape to the convex shape of the kamado oven 3 thereby fitting around the kamado air inlet 8 with a gasket (not shown) such that the kamado air inlet 8 is aligned with the chimney discharge port 47 so that all smoke and air entering the kamado oven 3 is controlled by chimney air valves 30, 31, and 32 which provide a smoke flow and air flow control means. The proportions of smoke and atmospheric air to the kamado oven 3 can be separately controlled. In addition, smoke from the invention can be released to atmosphere without entering the kamado oven 3.

In both embodiments, a chimney 27 (FIGS. 2-4, 6, 10, 11, and 13) is mounted to the firebox assembly 1 (FIGS. 1, 9, 16, and 17) to allow the smoke to exit the smoke chamber 22 or 122 (FIGS. 1, 5, 7, 9, 12, 14, 16, and 17) through smoke chamber right port 24 (in the preferred embodiment) or through smoke chamber left port 60 (in the alternative embodiment) in the direction of arrow 21 (FIGS. 1, 5, 9, 16, and 17) and flow outwardly therefrom into the chimney 27.

The chimney 27 (FIGS. 2-4, 6, 10, 11, and 13) has a lower chimney chamber 28 (FIGS. 1, 7, 9, 14, 16, and 17) and an upper chimney chamber 29 (FIGS. 1, 7, 9, 14, 16, and 17) that communicate via a chimney interchamber port 50 (FIGS. 1, 9, 16, and 17). The lower chimney chamber 28 is aligned with either the smoke chamber right port 24 (FIGS. 1, 7, 9, 14, 16, and 17) or the smoke chamber left port 60 (FIGS. 1, 5, 9, 12, and 14-17) to allow smoke to enter into the lower chimney chamber 28 and flow upwardly through the chimney interchamber port 50 into the upper chimney chamber 29. The smoke and air in the upper chimney chamber 29 flows into the kamado air inlet 8 (FIGS. 1, 9, 16, and 17) of the kamado oven 3 (FIGS. 1, 9, 16, and 17) via the chimney discharge port 47 (FIGS. 4, 8, 11, and 15).

In addition to the chimney interchamber port 50 (FIGS. 1, 9, 16, and 17) that communicates between the lower chimney chamber 28 (FIGS. 1, 7, 9, 14, 16, and 17) and the upper chimney chamber 29 (FIGS. 1, 7, 9, 14, 16, and 17), the lower chimney chamber 28 has a lower chimney port 46 (FIGS. 2, 3, and 10) connected to the atmosphere, and the upper chimney chamber 29 (FIGS. 1, 7, 9, 14, 16, and 17) has an upper chimney port 45 (FIGS. 2, 3, and 10) connected to the atmosphere and a chimney discharge port 47 (FIGS. 4, 8, 11, and 15) communicating to the kamado air inlet 8 (FIGS. 1, 9, 16, and 17) of the kamado oven 3 (FIGS. 1, 9, 16, and 17).

Figure 2:
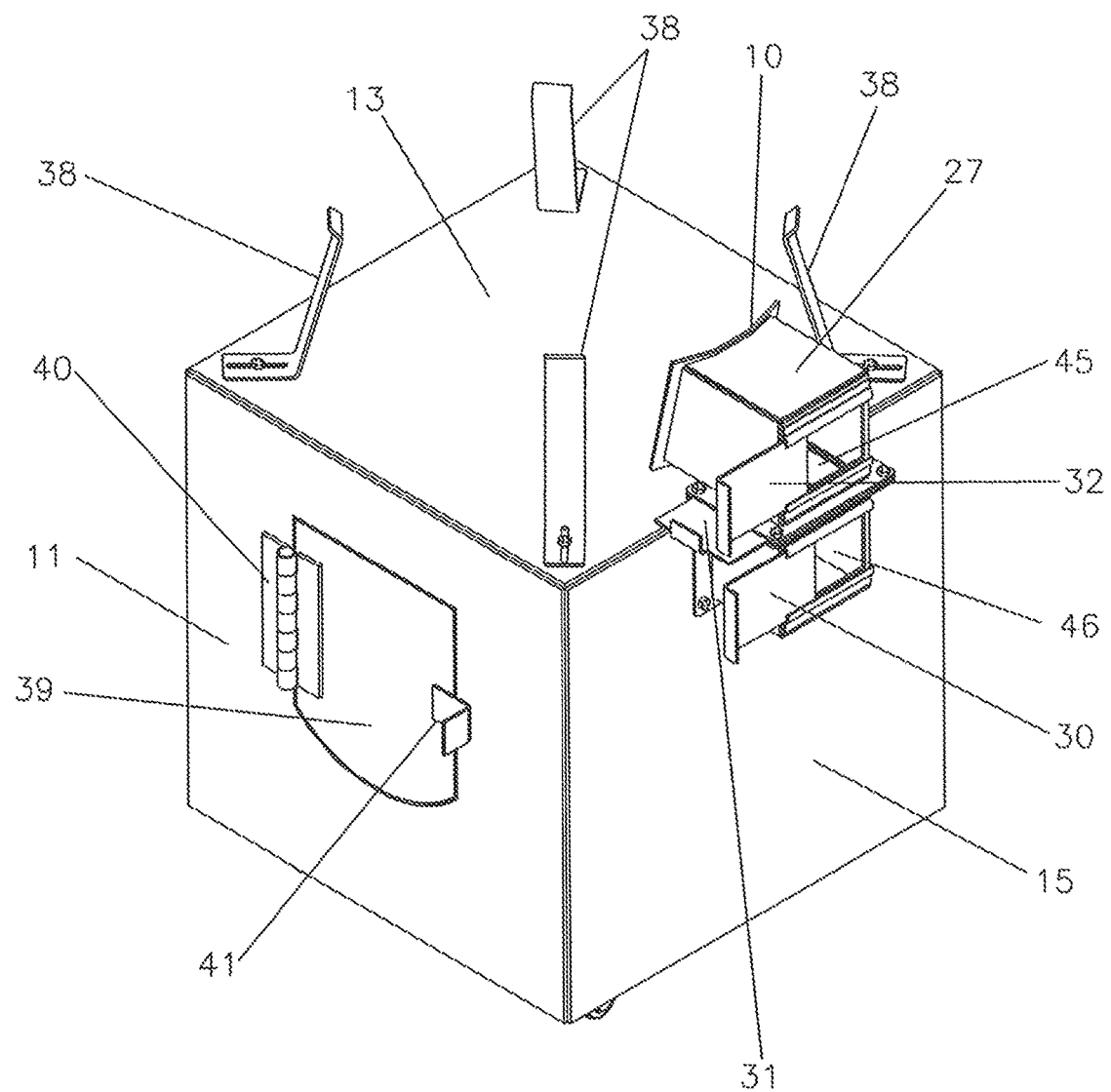
Figure 3:
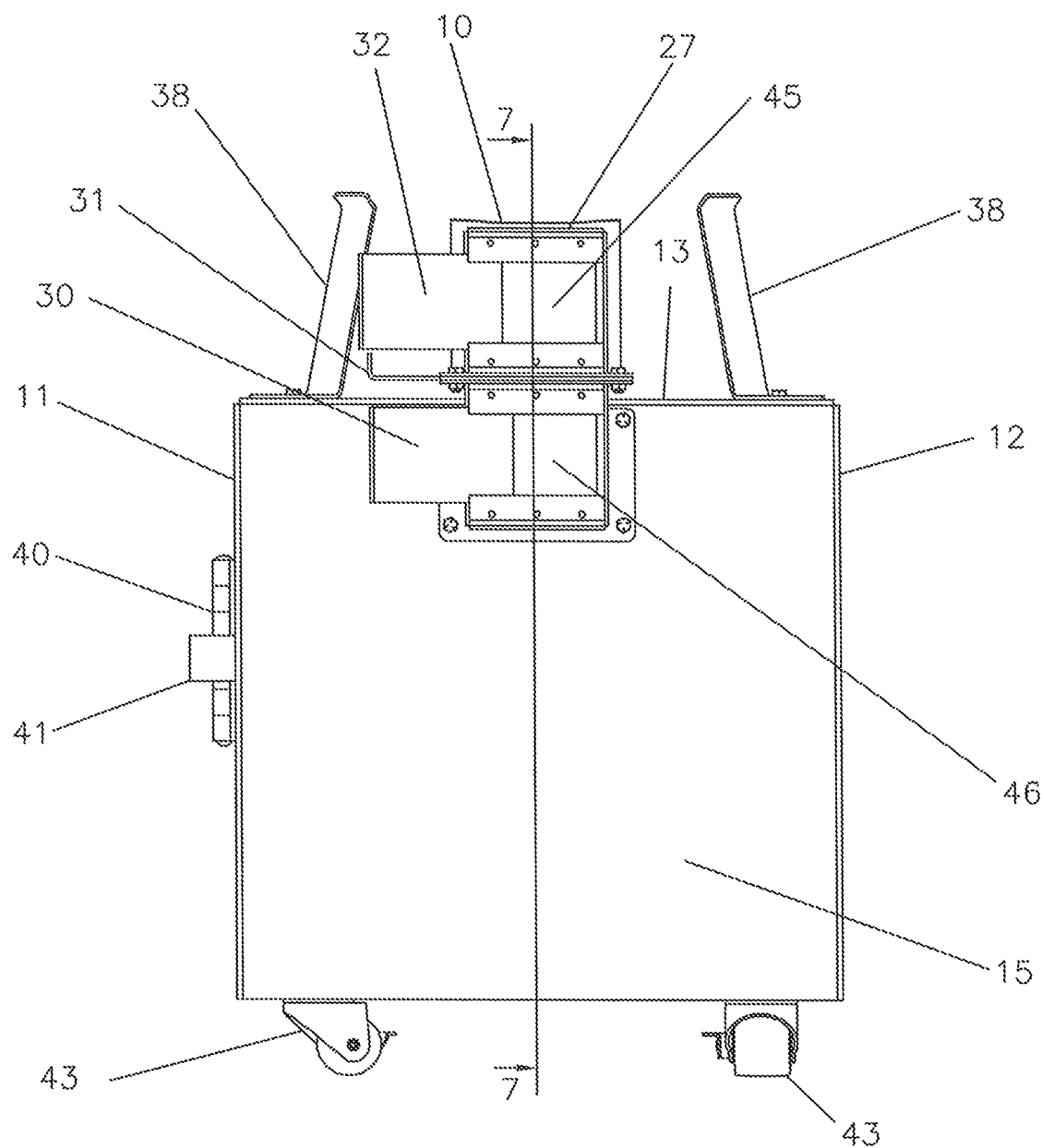
Figure 4:
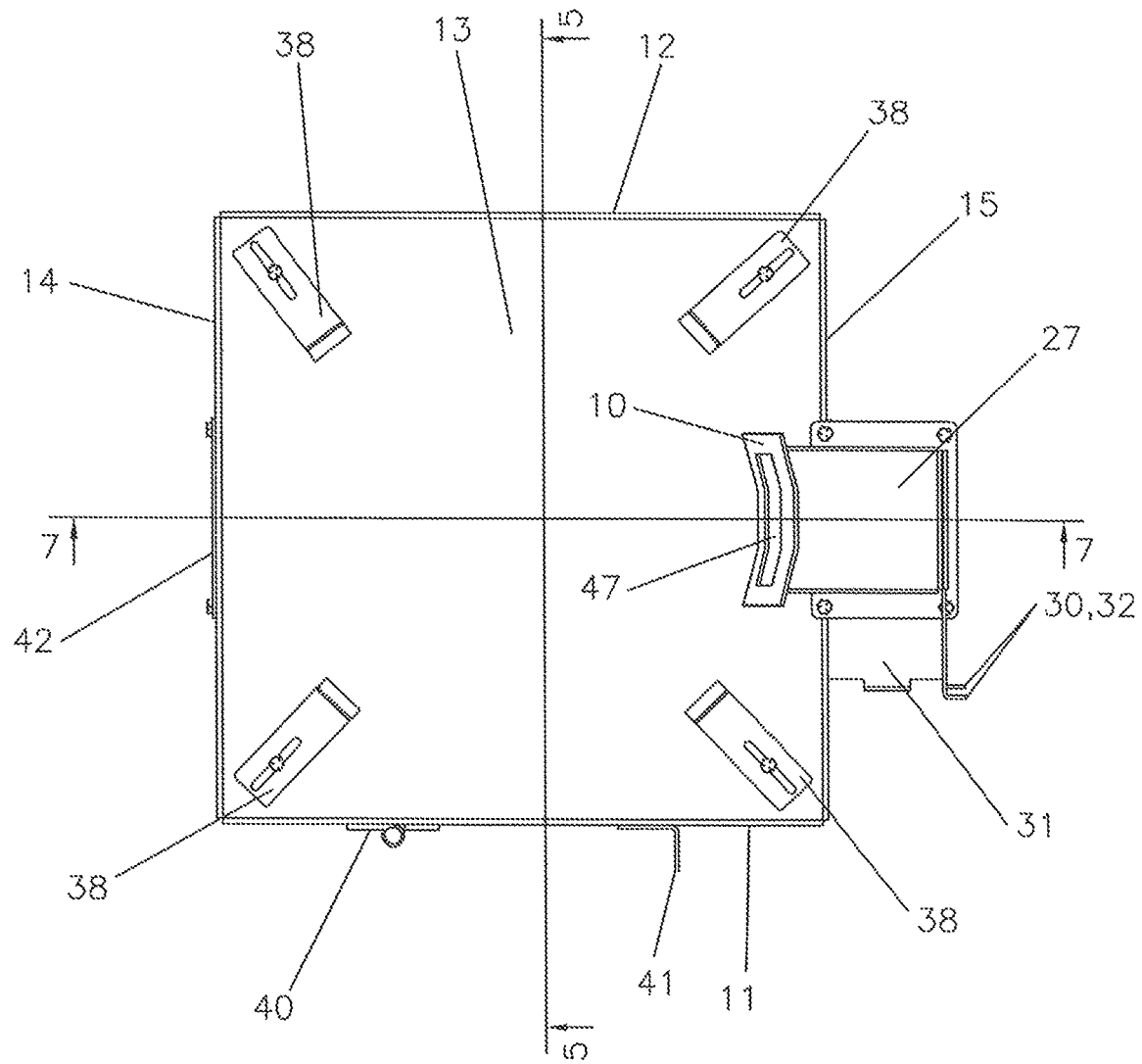

The chimney 27 (FIGS. 2-4, 6, 10, 11, and 13) has a slidable lower chimney air valve 30 (FIGS. 1-4, 6, 7, 9-11, 13, 14, 16, and 17) on the lower chimney port 46 (FIGS. 2, 3, and 10), a slidable chimney interchamber air valve 31 (FIGS. 1-4, 6-11, and 13-17) on the chimney interchamber port 50 (FIGS. 1, 9, 16, and 17), and a slidable upper chimney air valve 32 (FIGS. 1-4, 6-11, and 13-17) on the upper chimney port 45 (FIGS. 2, 3, and 10). These air valves are used to control the flow of smoke from the firebox assembly 1 and atmospheric air to the kamado air inlet 7 (FIGS. 1, 9, 16, and 17) of the kamado oven 3 (FIGS. 1, 9, 16, and 17) through the chimney discharge port 47 (FIGS. 4, 8, 11, and 15).

The three chimney air valves 30, 31, and 32 are shown in the open position where depicted in the figures. Each of the three chimney air valves 30, 31, and 32 has a plate shape with horizontally extending edge portions received in grooves provided in the chimney 27 allowing the plates to move between an open position, any intermediate position between open and closed, or a closed position over the chimney ports 28, 32, and 50.

With the lower chimney air valve 30 (FIGS. 1, 7, 9, 14, 16, and 17) in the open position and the chimney interchamber air valve 31 (FIGS. 1-4, 6-11, and 13-17) in the closed position, smoke from the smoke chamber 22 or 122 (FIGS. 1, 5, 7, 9, 12, 14, 16, and 17) will flow into the lower chimney chamber 28 (FIGS. 1, 7, 9, 14, 16, and 17) and then flow outwardly in the direction of arrow 33 (FIGS. 1, 9, 16, and 17) to the atmosphere via the lower chimney port 28 (FIGS. 1, 7, 9, 14, 16, and 17).

With the lower chimney air valve 30 (FIGS. 1, 7, 9, 14, 16, and 17) in the closed position, the chimney interchamber air valve 31 (FIGS. 1-4, 6-11, and 13-17) in the open position, and the upper chimney air valve 32 (FIGS. 1-4, 6-11, and 13-17) in the closed position, smoke from the smoke chamber 22 or 122 (FIGS. 1, 5, 7, 9, 12, 14, 16, and 17) will flow from the smoke chamber 22 to the lower chimney chamber 28 (FIGS. 1, 7, 9, 14, 16, and 17) and then to the upper chimney chamber 29 (FIGS. 1, 7, 9, 14, 16, and 17) and to the kamado air inlet 8 (FIGS. 1, 9, 16, and 17) of the kamado oven 3 (FIGS. 1, 9, 16, and 17) through the chimney discharge port 47 (FIGS. 4, 8, 11, and 15) as shown by arrow 34 (FIGS. 1, 9, 16, and 17).

The upper chimney chamber 29 (FIGS. 1, 7, 9, 14, 16, and 17) has an upper chimney air valve 32 (FIGS. 1-4, 6-11, and 13-17) on the upper chimney port 45 (FIGS. 2, 3, and 10). With the upper chimney air valve 32 in the open position, atmospheric air may flow into the upper chimney chamber 29 as shown by arrow 36 (FIGS. 1, 9, 16, and 17) and through the chimney discharge port 47 (FIGS. 4, 8, 11, and 15) to the kamado air inlet 8 (FIGS. 1, 9, 16, and 17) of the kamado oven 3 (FIGS. 1, 9, 16, and 17). When the upper chimney air valve 32 is in the partially open or fully open position, the atmospheric air drawn into the upper chimney chamber 29 via the upper chimney port 45 may mix with smoke from the chimney interchamber port 50 (FIGS. 1, 9, 16, and 17) if the chimney interchamber air valve 31 (FIGS. 1-4, 6-11, and 13-17) is in the partially open position or the fully open position and flow in the direction of arrow 35 (FIGS. 1, 9, 16, and 17) prior to flowing through the chimney discharge port 47 (FIGS. 4, 8, 11, and 15) to the kamado air inlet 8 of the kamado oven 3.

When the chimney interchamber air valve 31 (FIGS. 1-4, 6-11, and 13-17) is in the closed position and the upper chimney air valve 32 (FIGS. 1-4, 6-11, and 13-17) is in the open position, atmospheric air without smoke will flow through the chimney discharge port 47 (FIGS. 4, 8, 11, and 15) into the kamado air inlet 8 (FIGS. 1, 9, 16, and 17). The kamado adapter plate 10 (FIGS. 1-4, 7-11, and 14-17) and adapter-plate mounted gasket (not shown) having opening 47 (FIG. 4) to prevent atmospheric air bypassing the chimney 27 (FIGS. 2-4, 6, 10, 11, and 13) to be drawn into the kamado air inlet 8.

In the preferred embodiment, the chimney 27 (FIGS. 2-4, and 6) is installed to the fire assembly 1 (FIG. 1) at smoke chamber right port 24 (FIGS. 1 and 7) on the right wall 15 (FIGS. 1-4, 6, and 7). A cover plate 42 (FIGS. 1, and 4-8) is placed on smoke chamber left port 60 (FIGS. 1 and 5) to prevent smoke from exiting the smoke chamber 22 except through the chimney 27. The kamado base 6 (FIG. 1) is rotated 90 degrees to the right to align the kamado adapter plate 10 (FIGS. 1-4, and 7-8) around the kamado air inlet 8 (FIG. 1) with the kamado air inlet 8 aligned with the chimney discharge port 47 (FIGS. 4, 8, 1, and 15) to accept the smoke and air flow from the chimney 27. The air inlet flow controls (not shown) are removed in favor of the air flow controls 30, 31, and 32 of the chimney.

An alternative embodiment of the invention provides for installation of the chimney 27 (FIG. 9) to the smoke chamber left port 60 (FIG. 9) on the left wall 14 (FIG. 9) of the firebox assembly 1 (FIG. 9) combined with a 180 degree rotation of the kamado base 6 (FIG. 9) from that of the preferred embodiment to align the kamado air inlet 8 (FIG. 9) with the kamado adapter plate 10 (FIG. 9) and the chimney discharge port 47 (FIGS. 4, 8, 11, and 15). The functions of the chimney air valves 30, 31, and 32 in this alternative embodiment remain the same as the preferred embodiment. A cover plate 42 (in the preferred embodiment) (FIGS. 1, and 4-8) or pellet smoker assembly adapter 26 (in the alternative embodiment) (FIGS. 9-11, 13-15 and 17) is placed over the smoke chamber right port 24 (FIGS. 1, 7, 9, 14, 16, and 17) on the right wall 15 (FIGS. 1-4, 6, 7, 9-11, 13, 14, 16, and 17) of the firebox assembly 1 (FIGS. 1, 9, 16, and 17).

The system disclosed herein is designed to create a fire 2 or 112 not limited by availability of oxygen and to discharge the resulting smoke, possibly in combination with atmospheric air, to a kamado oven 3. The kamado oven 3 is shown mounted to the top of the firebox assembly 1 (FIGS. 1, 9, 16, and 17). Four spring biased arms 38 (FIGS. 1-5, 7-12, and 14-17) are mounted on the top wall 13 (FIGS. 2-5, 7, 8, 10-12, and 14-17) and are positioned ninety degrees apart to removably receive the kamado bottom 6 (FIGS. 1, 9, 16, and 17) of the kamado oven 3 (FIGS. 1, 9, 16, and 17) therebetween.

In normal use of the preferred embodiment of the invention, the door 39 of the firebox assembly 1 is open, allowing entry of oxygen through the door opening to feed the fire 2. The amount of smoke desired for use in the kamado oven 3 is drawn into the smoke chamber 22 and then to the chimney 27 and the kamado air inlet 8 as shown by pathway 21, 34, and 35 (FIG. 1) by natural draft as controlled by the kamado air outlet 7 air flow control 9. The remainder of the smoke in excess of that needed in the kamado oven 3 may be discharged through the door 39 opening of the firebox assembly 1.

In normal use of the alternative embodiment of the invention, the pellet smoker assembly 25 feeds combustible pellets to its fire pot to create a fire 112 producing smoke at a rate controlled by the temperature in the kamado oven 3 as monitored by a digital thermometer probe set in the kamado oven 3 at any desired location. A fan in the pellet smoker assembly 25 provides oxygen to the fire pot for the fire 112 and blows the smoke into the smoke chamber 122, then to the chimney 27, and then to the kamado air inlet 8 of the kamado oven 3 by forced air draft. No excess smoke is created in this embodiment.

When the fire 2 or 112 is not burning properly to create the desired smoke quality, the lower chimney air valve 30 can be opened and the chimney interchamber air valve 50 closed to release the undesirable smoke to the atmosphere through lower chimney port 46 via pathway 21 and 33 (FIG. 1) while pre-heating the fire chamber 18 or 118 and the smoke chamber 22 or 122. Preventing entry of this smoke into the kamado oven 3 eliminates the undesirable tastes and odors in the food being cooked associated with smoke without desirable qualities.

When the desired smoke quality is being created by the fire 2 or 112 in the fire chamber 18 or 118, the smoke is discharged from the fire chamber 18 or 118 to the smoke chamber 22 or 122 and then the lower chimney chamber 28 and then to the upper chimney chamber 29 and into the kamado oven 3 through the chimney discharge port 47 and the kamado air inlet 8. This process is accomplished by closing lower chimney air valve 30 and opening chimney interchamber air valve 31. The degree that chimney interchamber air valve 31 is open, along with the amount upper chimney air valve 32 is open allowing atmospheric air to mix with the smoke, controls the proportion of smoke and air drawn into the kamado oven 3 through the kamado air inlet 8.

As an example of the various positions of air valves 30, 31, and 32, the three air valves may all be closed thereby preventing any smoke flow or incoming air flow to the kamado oven 3. One position is to open chimney interchamber air valve 31 while closing lower chimney air valve 30 and upper chimney air valve 32, thereby directing smoke from the fire chamber 18 or 118 and the smoke chamber 22 or 122 to the kamado oven 3 while preventing atmospheric air flowing into the kamado oven 3 through the kamado air inlet 8 via air valves 30 or 32. A further position is to open air valve 31 and air valve 32 with air valve 30 closed, allowing a mixture of smoke and atmospheric air to flow to the kamado air inlet 8. An additional position is to close air valve 31 while opening air valve 32, preventing smoke from the fire chamber 18 or 118 and the smoke chamber 22 or 122 from flowing to the kamado oven 3 while atmospheric air is directed through upper chimney port 45 to the kamado air inlet 8. Other positions of the gates are possible.

The firebox assembly 1 can create adequate smoke and heat to use as the sole heat source for the kamado oven 3 in the aforementioned manners. Additionally, the system can be used in conjunction with the normal operation of the kamado oven 3. In this operating mode, combustion is initiated in the fire chamber 18 or 118 and a charcoal fire is simultaneously built in the kamado oven 3, providing two heat sources. The amount of smoke drawn into the kamado oven 3 is controlled by closing air valve 30 and partially or entirely opening air valve 31. Air valve 32 is open in this operating mode to provide oxygen to the charcoal fire in the kamado oven 3.

The kamado oven 3 can also function in its normal operating mode. The heat source in this case would be a charcoal fire within the kamado oven 3. In order to allow the kamado oven 3 to function in this manner, either air valve 32 is open with air valve 31 being closed or all three air valves are open without combustion in the fire chamber 18 or 118, allowing atmospheric air to enter the kamado air inlet 8.

In all of the operating modes above under the preferred embodiment with the firebox assembly 1 and kamado oven 3 at temperatures above ambient air temperature, the smoke and air flow through the kamado oven 3 is controlled by the kamado air outlet's 7 air flow control 9, typically a daisy-wheel style damper on the kamado dome 4. The temperatures of the fire chamber 18, the smoke chamber 22, the chimney 27, and the kamado oven 3, and the resulting natural draft, as well as the positions of the air valves 30-32, impact the rate of smoke and air flow through the system.

An alternative embodiment includes a forced air system. The smoke flow to the kamado oven 3 is controlled by the forced air system in the pellet smoker assembly 25 in combination with the natural draft created by the heated surfaces of the firebox assembly 1 and the kamado oven 3. Heat to the system is regulated by the pellet smoker assembly 25 controller, which monitors the temperature in the kamado oven 3 via a digital thermometer probe set within the kamado oven 3 and controls the rate at which pellets are fed to the fire pot that functions as the fire chamber 118 with fire 112. Normal operation would remove the kamado's air outlet 7 air flow control 9 in favor of the pellet smoker assembly 25 controls.

While the invention has been illustrated and described in detail in the drawings and foregoing description, the same is to be considered as illustrative and not restrictive in character, it being understood that only the preferred embodiment and one alternative embodiment has been shown and described and that all changes and modifications that come within the spirit of the invention are desired to be protected.

What is claimed is:

1. A Firebox Assembly to receive combustible material for generating controlled amounts of heated gas for a kamado oven having a vent comprising:
    a housing;
    a firebox forming a fire chamber in said housing with said firebox having a door opening into said fire chamber to allow combustible material to be inserted therein, said fire chamber having a heated gas outlet;
    a smoke chamber in fluid communication with said heated gas outlet to receive heated gas therefrom; and
    a chimney with valves with said chimney connected to said smoke chamber, said valves direct and limit gas flow from said gas outlet of said smoke chamber into the atmosphere and from said gas outlet and the atmosphere to a kamado oven;
    wherein said chimney has a first control chamber and a second control chamber, wherein said valves include a first slidable gate when open allowing gas from said first control chamber to flow externally outward of the firebox assembly, a second slidable gate disposed between said first control chamber and said second control chamber limiting gas flow from said first control chamber to said second control chamber, and a third slidable gate limiting flow of air external to said firebox assembly to flow into said second control chamber.

2. The firebox assembly of claim 1 and further comprising:
    spring biased arms mounted on said housing and extending upwardly being spaced apart defining a space for receiving and gripping the kamado oven and aligning said chimney with a vent of the kamado oven.

3. The firebox assembly of claim 2 and further comprising:
    an upper wall mounting said firebox to said housing; and,
    a bottom wall mounted to said housing and forming with said upper wall an air chamber adjacent said fire chamber, said bottom wall forming an opening allowing air flow out of said air chamber as air within said air chamber is heated by said fire chamber.

4. The fire box assembly of claim 1, wherein said smoke chamber is configured to receive smoke/gas from said fire chamber and connected to said vent of said kamado oven via said chimney; and holders atop said housing removably holding said kamado oven allowing alignment of said vent with said chimney.

5. The fire box assembly of claim 1, wherein said chimney includes a concave plate with an opening thereon positionable against said vent of said Kamado oven allowing fluid flow from said chimney into said Kamado oven.

6. The fire box assembly of claim 1, wherein said housing includes side, front and rear walls with said firebox located therebetween, one of said side, front and rear walls having a door opening into said fire chamber for introduction of combustible materials with one of said side, front and rear walls being spaced apart from said fire chamber allowing smoke/gas to escape said fire chamber into said smoke chamber.

7. A combination of a fire box assembly and a kamado oven comprising:
    a housing;
    a firebox within said housing forming a firebox assembly and including a surrounding wall structure defining an interior enclosure into which a fire may be conducted having an entrance for introducing combustible material to burn and further having a smoke/gas outlet;
    a kamado oven including an inlet vent to receive smoke/gas from said firebox;
    a chimney to direct gas/smoke from said smoke/gas outlet of said firebox to said inlet vent of said kamado oven, said chimney including an opening to the atmosphere external of said firebox assembly; and,
    valves connected to said chimney and having a first position directing smoke/gas from said smoke/gas outlet to said inlet vent while preventing air flow through said opening, a second position directing smoke/gas from said smoke/gas outlet and external air from said opening to said vent, and a third position limiting flow of smoke/gas to said vent while allowing air from said opening to said vent;
    wherein said housing has a smoke chamber connected to receive smoke/gas from said interior enclosure and connected to said vent of said kamado oven via said chimney; and holders atop said housing removably holding said kamado oven allowing alignment of said vent with said chimney;
    wherein said chimney includes a concave plate with an opening thereon positionable against said vent of said Kamado oven allowing fluid flow from said chimney into said Kamado oven;
    wherein said housing includes side, front and rear walls with said firebox located therebetween, one of said walls includes a door opening into said interior enclosure for introduction of combustible materials with one of said walls being spaced apart from said interior enclosure allowing smoke/gas to escape said interior enclosure into said smoke chamber;
    wherein said smoke chamber has an smoke/gas outlet in fluid communication with said chimney; and,
    wherein said valves are slidable gates with multiple positions between an open position and a closed position, said valves include at least two valves with one valve when open allowing smoke/gas flow from said smoke/gas outlet of said smoke chamber to said vent of said Kamado oven whereas another of said valves when open allowing external atmospheric air to flow into said chimney.

8. The combination of claim 7 wherein:
    said housing forms an air chamber between said walls which is exterior to said inner enclosure and further having a bottom structure beneath said firebox with an air inlet allowing heated air within said air chamber to escape when heated and expanding.

* * * * *